Patented May 17, 1927.

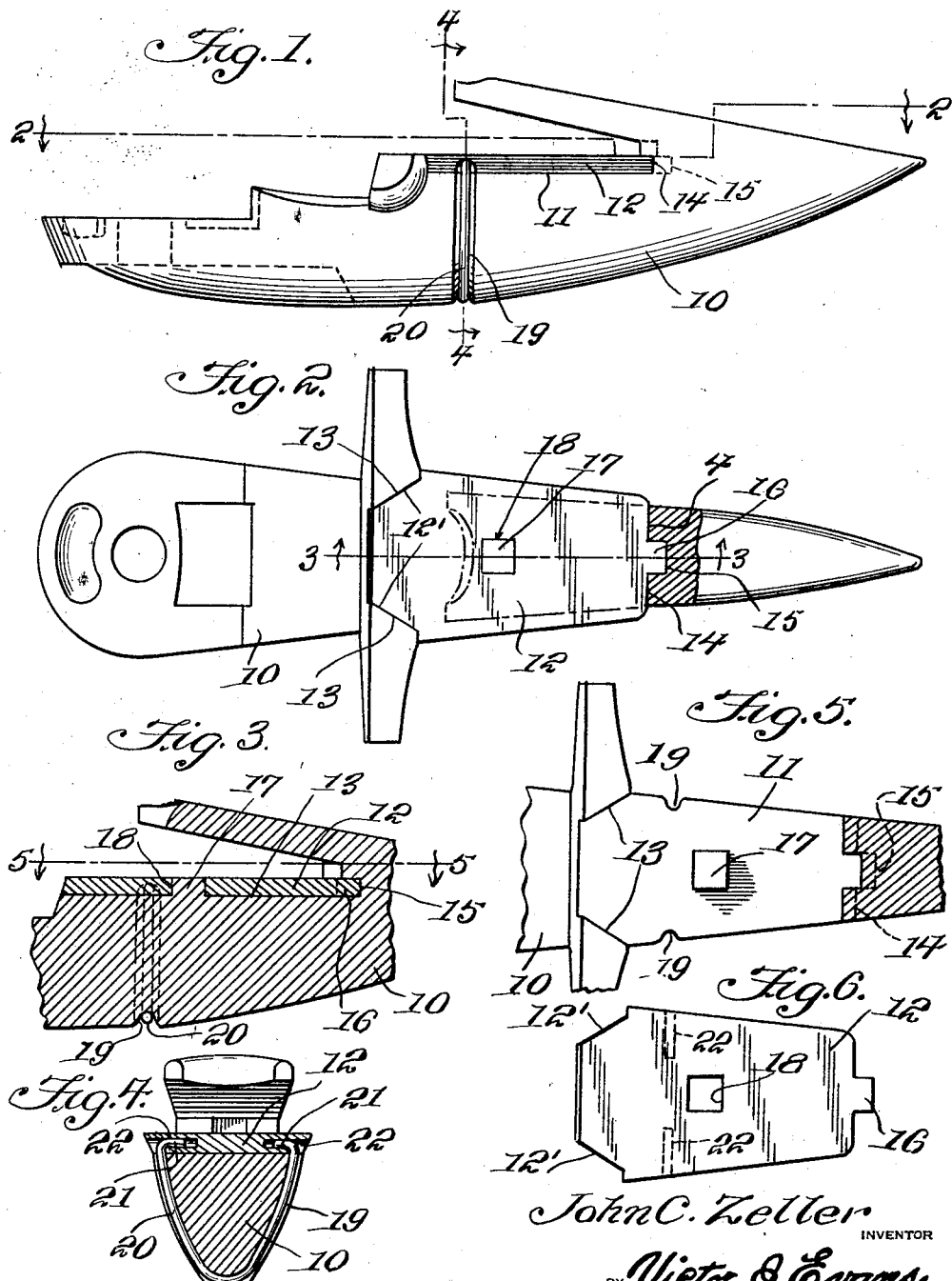

1,629,428

UNITED STATES PATENT OFFICE.

JOHN C. ZELLER, OF WATFORD CITY, NORTH DAKOTA.

SICKLE.

Application filed June 20, 1925, Serial No. 38,494. Renewed October 15, 1926.

This invention relates generally to improvements in mowers and has particular relation to the sickle construction of machines of this type, an object being to provide novel means for securing the ledger plate upon the finger of the sickle, so that the said plate may be securely attached, but may be readily removed for sharpening and easily and quickly replaced.

With the above and other objects in view, the invention further includes the following novel features and details of construction, to be hereinafter more fully described, illustrated in the accompanying drawings and pointed out in the appended claims.

In the drawings:—

Figure 1 is a side elevation showing the finger of a sickle with the invention applied.

Figure 2 is a sectional view taken substantially on the line 2—2 of Figure 1.

Figure 3 is a section on the line 3—3 of Figure 2.

Figure 4 is a section on the line 4—4 of Figure 1.

Figure 5 is a fragmentary sectional view on the line 5—5 of Figure 5 with the ledger plate removed.

Figure 6 is a plan view of the ledger plate.

Referring to the drawings in detail wherein like characters of reference denote corresponding parts, the reference character 10 indicates the finger of a sickle which may be attached to the finger bar in any suitable manner and which is provided with a seat 11 for the accommodation of a ledger plate 12.

Usually, the ledger plate is riveted in position, but the present invention provides means whereby this plate may be removably attached so that it may be sharpened and replaced. For this purpose, the plate is provided at one end with inwardly beveled corners 12' which fit within the tapered walls 13 of a recess provided at the inner end of the seat.

The outer end of the seat is provided with a groove 14 which extends transversely of the opposite end of the seat, while a socket 15 extends from the inner wall of the groove substantially central of the length of the latter. The plate 12 is adapted to have its outer end engage the walls of the groove 14 so as to hold this end of the plate upon the seat 11, while a tongue 16 which extends from the end of the plate engages the walls of the socket 15 and prevents independent lateral movement of the plate.

Extending upwardly from the seat 11 is an integral stud 17. This stud is preferably rectangular and engages the walls of an opening 18 provided in the plate 12 and acts in conjunction with the socket 15 and the walls 13 of the recess at the opposite end of the seat to prevent independent sliding movement of the ledger plate.

The finger 10 is provided with a groove 19 which extends transversely around said bar for the reception of a spring yoke 20. The ends of this yoke extend inwardly to provide oppositely disposed fingers 21 and the latter are adapted to engage the walls of openings 22 provided in the opposite side edges of the plate 12. The latter will thus be securely held upon the seat 11 but may be easily and quickly removed and replaced when desired.

The invention is susceptible of various changes in its form, proportions and minor details of construction and the right is herein reserved to make such changes as properly fall within the scope of the appended claims.

Having described the invention what is claimed is:—

1. In a mower, a guard finger, said finger having a ledger plate seat, a ledger plate, means at one end of the seat for engagement by the plate to prevent independent upward movement of said plate, means to prevent sliding movement of the plate upon the seat and means extending around the finger and detachably engaging the plate to removably hold the latter in position.

2. In a mower, a guard finger, said finger having a ledger plate seat, a ledger plate, means at one end of the seat for engagement by the plate to prevent independent upward movement of said plate, means to prevent sliding movement of the plate upon the seat and a spring yoke extending around the finger and detachably engaging the plate to removably hold the latter in position.

In testimony whereof I affix my signature.

JOHN C. ZELLER.